United States Patent [19]

Ohta

[11] Patent Number: 4,644,235
[45] Date of Patent: Feb. 17, 1987

[54] CONTROL APPARATUS FOR AUTOMOTIVE POWER-OPERATED CONVERTIBLE ROOF

[75] Inventor: Hisatoshi Ohta, Kariya, Japan

[73] Assignee: Toyota Jidosha Kabushiki Kaisha, Japan

[21] Appl. No.: 676,291

[22] Filed: Nov. 29, 1984

[30] Foreign Application Priority Data

Dec. 1, 1983 [JP] Japan ............................. 58-227137

[51] Int. Cl.⁴ .................... B60J 7/08; H02P 1/22
[52] U.S. Cl. ................................ 318/282; 318/280; 318/558; 296/117
[58] Field of Search ............ 296/107, 108, 116, 117, 296/105, 112, 115, 116, 147, 216, 223; 307/9, 10 R; 318/255, 256, 280, 281, 282, 436, 558

[56] References Cited

U.S. PATENT DOCUMENTS

| | | | |
|---|---|---|---|
| 2,309,926 | 2/1943 | Baker | 296/117 |
| 2,640,958 | 6/1953 | Davis | 296/107 X |
| 2,753,508 | 7/1956 | Inman | 296/117 X |
| 2,836,457 | 5/1958 | Beerman et al. | 296/107 X |
| 3,116,087 | 12/1963 | Baumann | 296/117 |
| 3,118,135 | 6/1965 | Bernstein et al. | 296/117 |
| 3,584,912 | 6/1971 | Leger | 296/117 |

Primary Examiner—William M. Shoop, Jr.
Assistant Examiner—Bentsu Ro
Attorney, Agent, or Firm—Finnegan, Henderson, Farabow, Garrett & Dunner

[57] ABSTRACT

A control apparatus for an automotive power-operated convertible roof includes means for detecting movement of a vehicle, drive means for opening and closing the automotive convertible roof, a relay for preventing the opening and closing of the convertible roof and roof opening/closing controlling means for controlling the relay to inhibit the opening and closing of the convertible roof when the velocity of the vehicle detected by the movement state detecting means is not below a predetermined speed level. As a result, is unlikely that the convertible roof will be opened or closed erroneously during movement of the vehicle, nor is there the possibility of damage to the roof caused by an excessive wind pressure during opening or closing of the roof. In addition, no special consideration is needed about the possibility of floating or vibration of the vehicle body caused by wind pressure acting on the roof, and vehicle stability is enhanced.

4 Claims, 3 Drawing Figures

CONTROL APPARATUS FOR AUTOMOTIVE POWER-OPERATED CONVERTIBLE ROOF

BACKGROUND OF THE INVENTION (1) Field of Art

The present invention relates to a control apparatus for an automotive power-operated convertible roof and more particularly to a control apparatus for an automotive power-operated convertible roof which apparatus detects movement of a vehicle to control the opening and closing of the convertible roof.

(2) Prior Art

Recently, with diversification in the purpose of use of vehicles and with the tendency to the utilization of power of the operation of various devices carried on vehicles, various types of vehicles have been produced. As an example, mention may be made of a vehicle provided with a roof capable of being opened and closed by power, namely, a power-operated convertible roof. In this convertible roof, however, the entire roof is opened and closed unlike a so-called sun roof in which only a part of the roof is opened and closed. The roof encounters wind pressure during opening or closing while the vehicle is in a running state i.e., moving, and it is capable of being damaged. Further, it is possible that the wind pressure acting on the roof will cause floating or vibration of the vehicle body.

FIG. 1 represents the relationship between opened and closed positions of the roof and forces acting on the roof. Since the force acting on the roof is given as the product of wind pressure per unit area and an effective area of exposed roof, it is seen that the roof receives the largest force during its opening or closing motion. In consideration of the generation of such force acting on the roof, the present invention has been accomplished as a result of extensive studies.

SUMMARY OF THE INVENTION

It is the object of the present invention to restrict the opening and closing of an automotive power-operated convertible roof according to the speed of the vehicle to prevent opening and closing of the roof during vehicular movement, thereby eliminating the occurrence of damage of the roof caused by wind pressure which is induced by running of the vehicle, further eliminating the likelihood of floating and vibration of the vehicle body and improving vehicular stability while the vehicle is moving.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the control apparatus of this invention for preventing damage by wind pressure to the power-operated convertible roof of a vehicle comprises detecting means for generating a signal indicative of vehicle movement which is not lower than a predetermined speed level; driving means for opening and closing said convertible roof; means connected to the output of said detecting means for providing a control signal in response to the generation of a signal indicative of vehicle movement not lower than the predetermined speed level; roof fail-safe means responsive to the output of said control signal providing means for inhibiting said driving means by removing power therefrom and preventing the opening or closing of said convertible roof by said driving means when said vehicle movement is not lower than said predetermined speed level, thereby preventing damage by wind pressure to said roof.

Thus, broadly in the control apparatus for an automotive power-operated convertible roof of the present invention, the operation of the convertible roof is inhibited when the detected vehicular velocity is not below a predetermined speed level, so it is not likely that the convertible roof will be opened or closed erroneously during vehicular movement, nor is there the possibility of damage of the roof caused by an excessive wind pressure during opening or closing of the roof. In addition, no special consideration is needed about the possibility of floating or vibration of the vehicle body caused by wind pressure acting on the roof, whereby the stability of the vehicle during operation is enhanced. It is also possible to obtain a secondary effect in that there will not be the fuel loss that would be caused by wind pressure if opening or closing of the roof occurred when the vehicle was moving above the predetermined speed.

The accompanying drawings, which are incorporated in and constitute a part of this specification, illustrate embodiments of the invention and, together with the description, serve to explain the principles of the invention.

DESCRIPTION OF PREFERRED EMBODIMENTS

Embodiments of the present invention will be described hereinunder with reference to the drawings.

Figure 1:
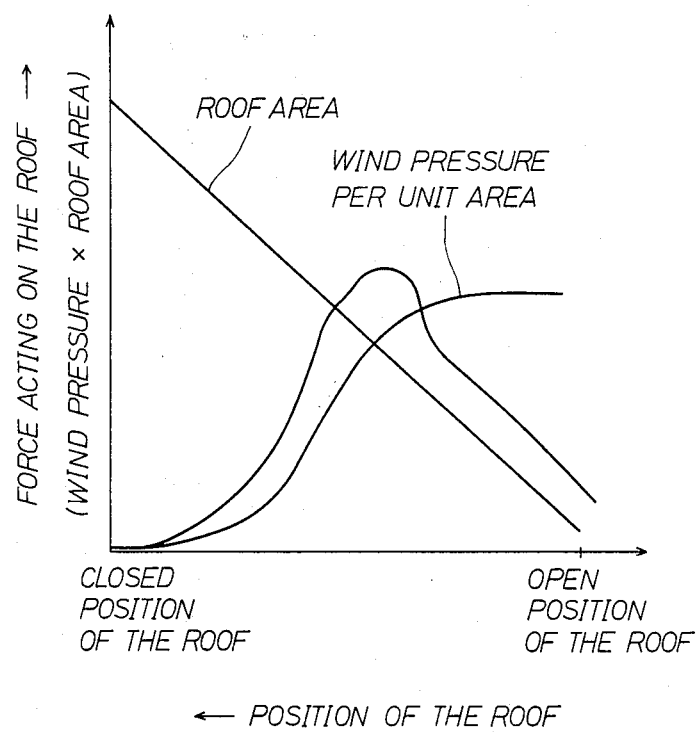
FIG. 1 is an explanatory view showing the relation between opened and closed positions of a convertible roof.
Figure 2:
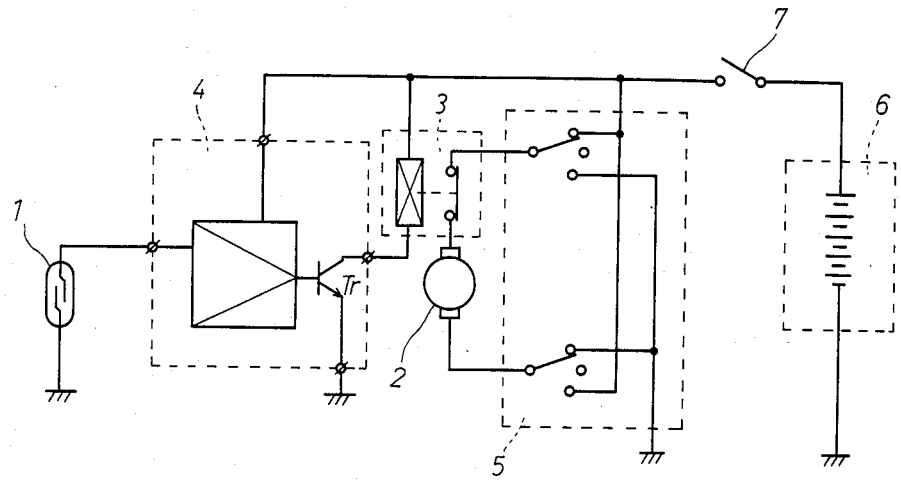
FIG. 2 is a circuit diagram according to a first embodiment of the present invention.

FIG. 2 is a circuit diagram according to a first embodiment of the present invention, in which the numeral 1 denotes a vehicle speed sensor which serves as vehicular movement detecting means; the numeral 2 denotes an electric motor which serves as drive means for opening and closing an electric motor which serves as drive means for opening and closing an automotive convertible roof; the numeral 3 denotes a normally closed relay, and it functions as opening/closing preventing means for stopping the supply of power to the electric motor 2. A control circuit 4 serves as roof opening/closing control means for discriminating the movement of a vehicle in accordance with a vehicle speed signal provided from the vehicle speed sensor 1 and actuating the relay 3 when the vehicle is running at a speed not lower than a predetermined speed, that is, for example, when the vehicle is essentially stopped. The numeral 5 denotes a change-over switch for starting the motor and switching the roof opening and closing directions from one to the other; and the numeral 6 denotes a battery for the supply of electric power to the motor 2 and other electric circuits through a key switch 7.

The circuit of this embodiment is designed so that as long as the key switch 7 is on and a normal power supply is provided by the battery 6, the relay 3 operates through the control circuit 4 in accordance with the vehicle speed detected by the vehicle speed sensor 1. When the vehicle speed detected by the vehicle speed sensor 1 is lower than a predetermined speed, the control circuit 4 does not actuate the relay 3 and the contacts of the relay 3 are closed, so that the opening or closing of the convertible roof can be done by operating the change-over switch 5 to start the motor 2. When a vehicle speed at the predetermined level or higher is detected by the vehicle speed sensor 1 such as by acceleration of the vehicle, the control circuit 4 actuates the relay 3, so that the contacts of the relay are opened. Consequently, the motor 2 can no longer be driven by operation of the change-over switch 5. In this embodiment, while the vehicle is running at a speed equal to or above the predetermined speed, it is not regarded as being in a state in which the roof can be opened or closed, and it is impossible to open or close the convertible roof. Therefore, the foregoing problems caused by an excessive pressure will not occur during opening or closing of the roof. Since in this embodiment there is used the vehicle speed sensor as movement detecting means, the opening and closing of the roof can be controlled accurately by detecting the speed of a vehicle in which the wind pressure acting on the roof would cause problems if the roof were opened or closed.

The following description is now provided about a second embodiment of the present invention.

Figure 3:
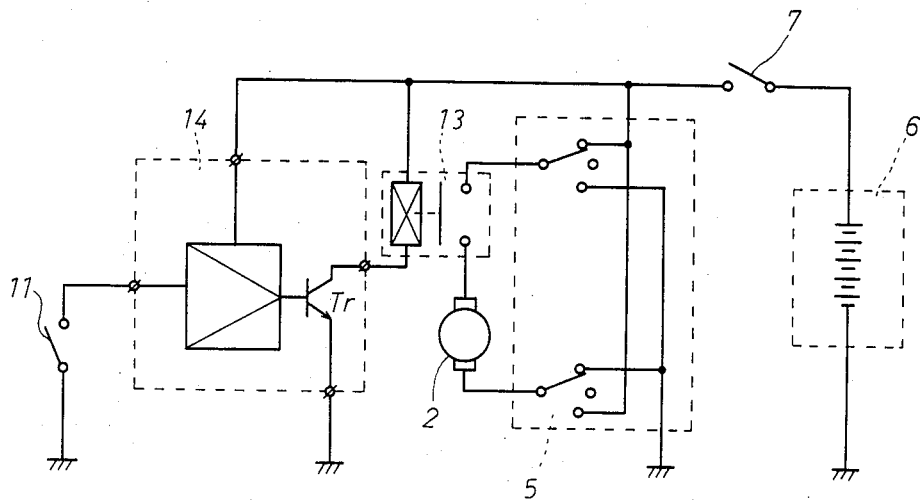
FIG. 3 is a circuit diagram according to a second embodiment of the present invention.

FIG. 3 is a circuit diagram of a control apparatus according to the second embodiment, in which the apparatus is provided with a parking brake switch 11 for detecting a parked state as the vehicular movement detecting means in place of the vehicle speed sensor 1 in the first embodiment. A relay 13 with normally opened contacts in place of the normally closed relay 3 is provided as the opening/closing preventing means for stopping the power supply to the motor. A control circuit 14 for actuating the relay 13 in accordance with a signal provided from the parking brake switch 11 is used in place of the control circuit 4 of FIG. 2 which actuates the relay 3 in accordance with a signal provided from the vehicle speed sensor 1.

The control apparatus of this embodiment is designed so that as long as the key switch 7 is on and a normal power supply is provided from the battery 6, the relay 13 operates through the control circuit 14 in accordance with a detection signal provided from the parking brake switch 11. When the parking brake is pulled that so the parking brake switch 11 is on, the vehicle can be regarded as being in a stopped state at a speed lower than the predetermined speed level, and therefore the control circuit 14 actuates the relay 13 to close the relay contacts. The motor 2 can now be started by operation of the change-over switch 5 to open or close the convertible roof. On the other hand, when the parking brake switch 11 is off, the vehicle is ready to run, and the control circuit 14 can not actuate the relay 13, thus making it impossible to open or close the roof.

Although in this embodiment the parking brake switch 11 is used directly as the vehicular detecting means, it is apparent that the inhibition of operation of the convertible roof driving motor 2 may be released upon turning on of the parking brake switch 11 or, alternatively, following a predetermined time after turning on of the brake switch 11. As another alternative in an automatic transmission type automobile, if the transmission is in the parking range, or if a predetermined time has elapsed after the transmission entered the parking range, these conditions may be used for releasing the inhibition of operation of the convertible roof driving motor 2, in place of the parking brake switch. In this embodiment, moreover, since the stopped state detecting device is used as the movement detecting means, the relay 13 as the opening/closing preventing means can be a normally opened type, serving as the means by which the roof cannot be opened or closed if an accident such as the breaking of a wire occurs. The relay 13 is thus a fail safe means. Consequently, a higher safety can be realized in the roof opening and closing control.

In the above first and second embodiment, as set forth hereinabove, since there is used a vehicular movement detecting means such as the vehicle speed sensor or the parking brake switch, the operation of the power-operated convertible roof can be limited and even inhibited when the vehicular running state is not lower than a predetermined speed level or cannot be regarded as being in a stopped state.

Further, although in the foregoing embodiments the apparatus are constructed so that the opening and closing of the convertible roof can be done only when the change-over switch 5 is turned ON, it is also preferable from the standpoint of safety to construct the apparatus so that once "open" or "close" control is initiated in a stopped state of a vehicle, the control is continuous to full open or full closed of the roof, using a self-holding circuit or the like.

Moreover, although in the foregoing embodiments an electric motor is used as the power source for the convertible roof, there may be used an air pressure or oil pressure as the power source.

What is claimed is:

1. Control apparatus for preventing damage by wind pressure to the power-operated convertible roof of a vehicle comprising:
   detecting means including a vehicle speed sensor for generating a signal indicative of vehicle velocity which is not lower than a predetermined speed level;
   driving means for opening and closing said convertible roof comprising an electric motor and a change-over switch for switching power to said electric motor and opening and closing said roof;
   means connected to the output of said detecting means for providing a control signal in response to the generation of a signal indicative of vehicle movement not lower than the predetermined speed level; and
   means responsive to the output of said control signal providing means for inhibiting said driving means by removing power therefrom and preventing the opening or closing of said convertible roof by said driving means when said vehicle movement is not lower than said predetermined speed level, thereby preventing damage by wind pressure to said roof.

2. Control apparatus as claimed in claim 1, wherein said inhibiting means comprises a normally closed relay which is switched to an open state so as to inhibit said convertible roof from opening or closing in the presence of said control signal, and which remains in the closed state so as to permit the opening and closing of said convertible roof by said electric motor and change-over switch in the absence of said control signal.

3. Control apparatus for preventing damage by wind pressure to the power-operated convertible roof of a vehicle comprising:

detecting means including a parking-brake switch for generating a signal indicative of the parking brake being applied;

driving means for opening and closing said convertible roof comprising an electric motor and a change-over switch for switching power to said electric motor and opening and closing said roof;

means connected to the output of said detecting means for providing a control signal in response to the generation of a signal indicative of the vehicle being in a stopped condition; and roof fail-safe means responsive to the output of said control signal for providing power to said driving means so that said convertible roof can be opened or closed by said driving means only when said vehicle is in the stopped condition, thereby preventing damage by wind pressure to said roof.

4. Control apparatus as claimed in claim 3, wherein said roof fail-safe means comprises a normally open relay which is held in the open state so as to inhibit said convertible roof from opening or closing in the absence of a control signal indicative of said parking brake being applied, and which is switched to a closed state so as to permit the opening and closing of said convertible roof by said electric motor and change-over switch in the presence of said control signal.

* * * * *